United States Patent [19]

Herbert

[11] 4,452,466
[45] Jun. 5, 1984

[54] TRAILER CONTROL DEVICE FOR TRACTOR-TRAILER VEHICLES

[76] Inventor: William B. Herbert, R.D. #2, Box 448, Shawangunk, N.Y. 12566

[21] Appl. No.: 443,192

[22] Filed: Nov. 22, 1982

[51] Int. Cl.³ .................................................. B62D 53/06
[52] U.S. Cl. ...................................................... 280/432
[58] Field of Search ............ 280/432, 433, 434, 446 B

[56] References Cited

U.S. PATENT DOCUMENTS

| | | | |
|---|---|---|---|
| 2,468,705 | 4/1949 | Price | 280/432 |
| 2,470,383 | 5/1949 | Wakeman | 280/432 |
| 2,668,720 | 2/1954 | Finch | 280/432 |
| 2,682,421 | 6/1954 | Bishop | 280/432 |
| 2,709,088 | 5/1955 | Orbits | 280/432 |
| 2,723,865 | 11/1955 | Leoni | 280/432 |
| 2,804,314 | 8/1957 | Billingsley | 280/432 |
| 2,805,292 | 9/1958 | Holland | 280/434 |
| 3,231,295 | 1/1966 | Till | 280/432 |
| 3,328,051 | 6/1967 | Hope | 280/432 |
| 3,722,913 | 3/1973 | Conner | 280/432 |
| 3,722,919 | 3/1973 | Herbert | 280/432 |
| 3,857,584 | 12/1974 | Mascuch | 280/432 |

*Primary Examiner*—John A. Pekar
*Attorney, Agent, or Firm*—Albert F. Kronman

[57] ABSTRACT

A control device carried beneath the fifth wheel of the tractor or truck of a tractor-trailer vehicle and coupled to the trailer, in which dangerous lateral movements of the trailer with respect to the tractor while under way are prevented by arresting means responsive to the vehicle brakes applied during the initial lateral movement of the trailer. The lateral travel of the trailer is stopped before it can reach a point beyond which it cannot be returned to a normal position and which might result in jackknifing. The device acts upon normal vehicle brake application by the driver and without regard to the direction or directions of lateral movement.

14 Claims, 8 Drawing Figures

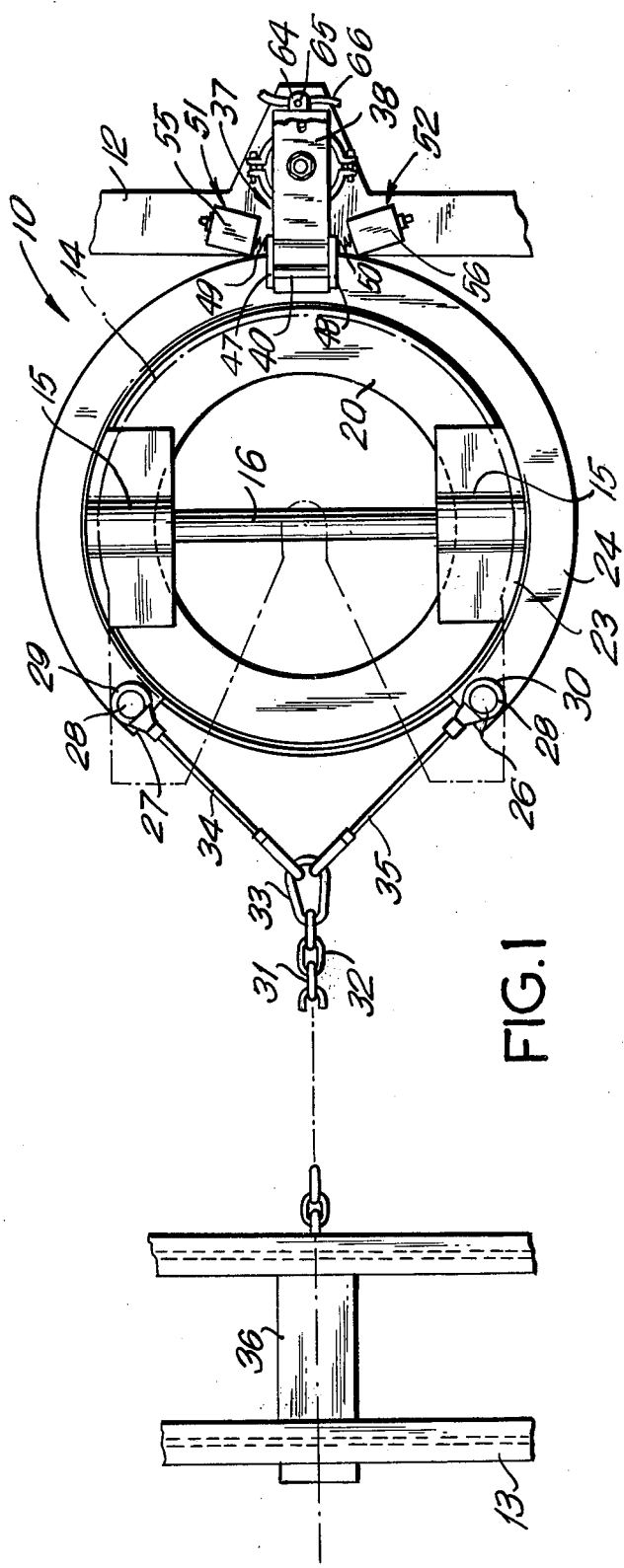
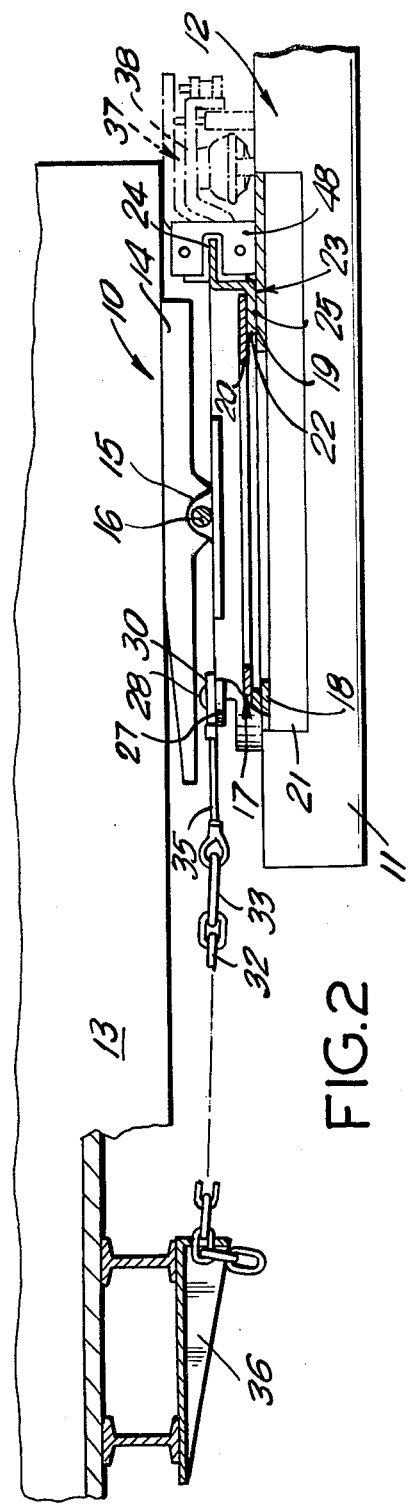
FIG.1
FIG.2

TRAILER CONTROL DEVICE FOR TRACTOR-TRAILER VEHICLES

BACKGROUND OF THE INVENTION

Devices for the purpose of arresting lateral swinging of the trailer portion of a tractor-trailer vehicle before it causes the condition known as jackknifing, are well-known in the art. Since some swinging of the trailer is unavoidable and even necessary when negotiating curves, it is not possible to rigidly couple the tractor to the trailer. Certain prior art devices depend upon the driver's judgement for application of the trailer restraining mechanism. Since the lateral movement of the trailer must be kept within a specific range to prevent it reaching the cross-over point which results in jackknifing, such devices have not solved the problem.

Other prior art devices have placed highly complicated mechanisms on the trailer of the vehicle which caused interference with other parts of the trailer, tractor-trailer coupling devices, hydraulic lines and the like, making the coupling and uncoupling of the vehicle time consuming. Since a single tractor may be used for several trailers such devices have proved to be extremely expensive for fleet operators.

Highly complicated, electronically controlled safety devices for restraining swinging motion of the trailer independently of the driver's control have not, proven satisfactory from a reliability and maintenance standpoint.

Accordingly, it is an object of the present invention to provide a trailer control device for tractor-trailer vehicle which will overcome the shortcomings of prior art devices.

Another object of the present invention is to provide a trailer control device which is easily coupled between tractor and trailer and which is between top of the tractor frame and top plate of the fifth wheel of the tractor.

A further object of the present invention is to provide a trailer control apparatus which will cause the trailer to seek a straight or centered position following an undesirable lateral swing without subsequent undue over swing.

Still another object of the present invention is to provide a simplified control apparatus which does not require complicated trailer position sensing equipment or attention from the driver of the vehicle.

SUMMARY OF THE INVENTION

The trailer control apparatus according to the present invention comprises a device for restraining the lateral swing of the trailer portion of a tractor trailer vehicle to a permitted angle from each side of the vehicle center line. A substantially ring shaped control member having a flanged portion is secured to the tractor beneath, and concentric with the fifth wheel of the tractor. The control ring is rotatably carried upon a bearing plate secured to the frame of the tractor. Spaced posts carried by the control ring receive coupling means for attaching the trailer to the control ring. A caliper brake secured to the tractor, having spaced arcuate arresting surfaces, receives the flange between the said arresting surfaces. The caliper brake is pivotally mounted on the tractor so that it can swing a limited distance on either side of the longitudinal axis of the tractor. Stops are provided at each end of the permitted travel of the caliper brake to limit the travel of the caliper. Valves operatively coupled to the tractor's fluid brake system are positioned in the path of the caliper brake as it reaches the end of its travel to apply the full restraining power of the caliper brake to the control ring. The application of pedal force to the tractor's brakes by the driver automatically activates the arresting device.

BRIEF DESCRIPTION OF THE DRAWINGS

In the accompanying drawings forming part hereof similar parts have been given the same reference numerals, in which drawings:

FIG. 1 is a top plan view in reduced scale of a trailer control device for tractor-trailer vehicles made in accordance with the present invention.

FIG. 2 is a view in side elevation of the device shown in FIG. 1, with certain parts broken away and sectioned.

DETAILED DESCRIPTION

Figure 3:
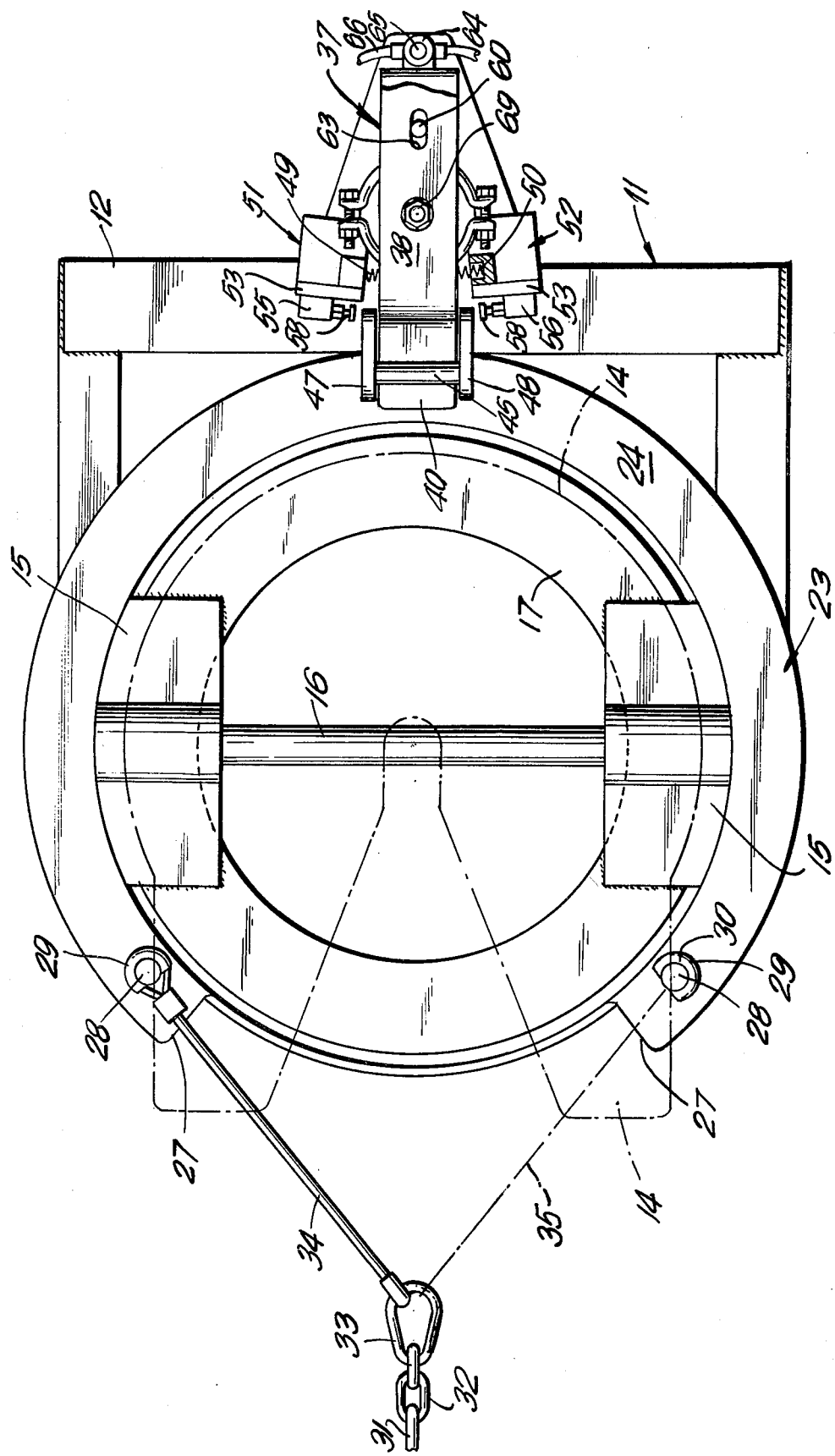
FIG. 3 is a plan view of a tractor fifth wheel showing the trailer control apparatus of FIGS. 1 and 2 on an enlarged scale.

Referring to the drawings and particularly to FIGS. 1-3, 10 indicates a trailer control device for tractor-trailer vehicles secured to the frame 11 of the tractor 12 portion of a tractor-trailer type vehicle.

The trailer portion 13 of the vehicle is coupled to the tractor 12 by means of fifth wheel 14, and coupling apparatus, well-known in the vehicle art. Trunnion bearings 15 carried by the tractor frame 11 serve to freely support a shaft 16 upon which the fifth wheel 14 is rockably mounted.

A bearing plate 17 which may be built up of three ringshaped members 18, 19, 20 is secured to a heavy saddle plate 21 carried by the tractor frame beneath the fifth wheel 14. The bearing plate rings 18-20 are substantially concentric with the fifth wheel 14 as shown in FIG. 2. Bearing plate ring 19 has a smaller outside diameter than bearing plate rings 18 and 20 so as to provide a bearing surface for the inside diameter 22 of a control ring 23.

The control ring 23 in one embodiment is somewhat "Z" shaped in cross-section, as best shown in FIG. 2, to provide outwardly and an inwardly extending flanges 24, 25. The inwardly extending flange 25 is received between the bearing plate rings 18, 20 to maintain its horizontal position as the control ring rotates about the bearing plate ring 19, as hereinafter more fully described. Normal lubrication such as heavy grease applied between the bearing plates rings 18-20 is adequate to insure free movement of the control ring. It will be apparent that the control ring 23 also lies below the fifth wheel 14 and is substantially concentrically mounted with respect to said wheel.

The control ring flange 24 is interrupted for a portion of its circumference facing the trailer 13 as shown at 26 to provide a gap 27 so that it will not interfere with coupling and uncoupling operations. An upstanding post 28 is secured to the ends of the control ring 23 on each side of the gap 27. The posts 28 serve to anchor two of the ends 29, 30 of a "Y" shaped hitch 31. The hitch 31, well-known in the art, includes a cable or chain portion 32 connected by a coupling ring 33 at one end to the diverging cables 34, 35 of the hitch and at its other end to a heavy plate 36 or hook secured on the centerline of the trailer. It will be apparent that any lateral swing of the trailer with respect to the tractor will cause the hitch 31 to rotate the control ring 23 and conversely that a restraint of the rotation of the control ring will limit the lateral swing of the trailer.

Figure 6:
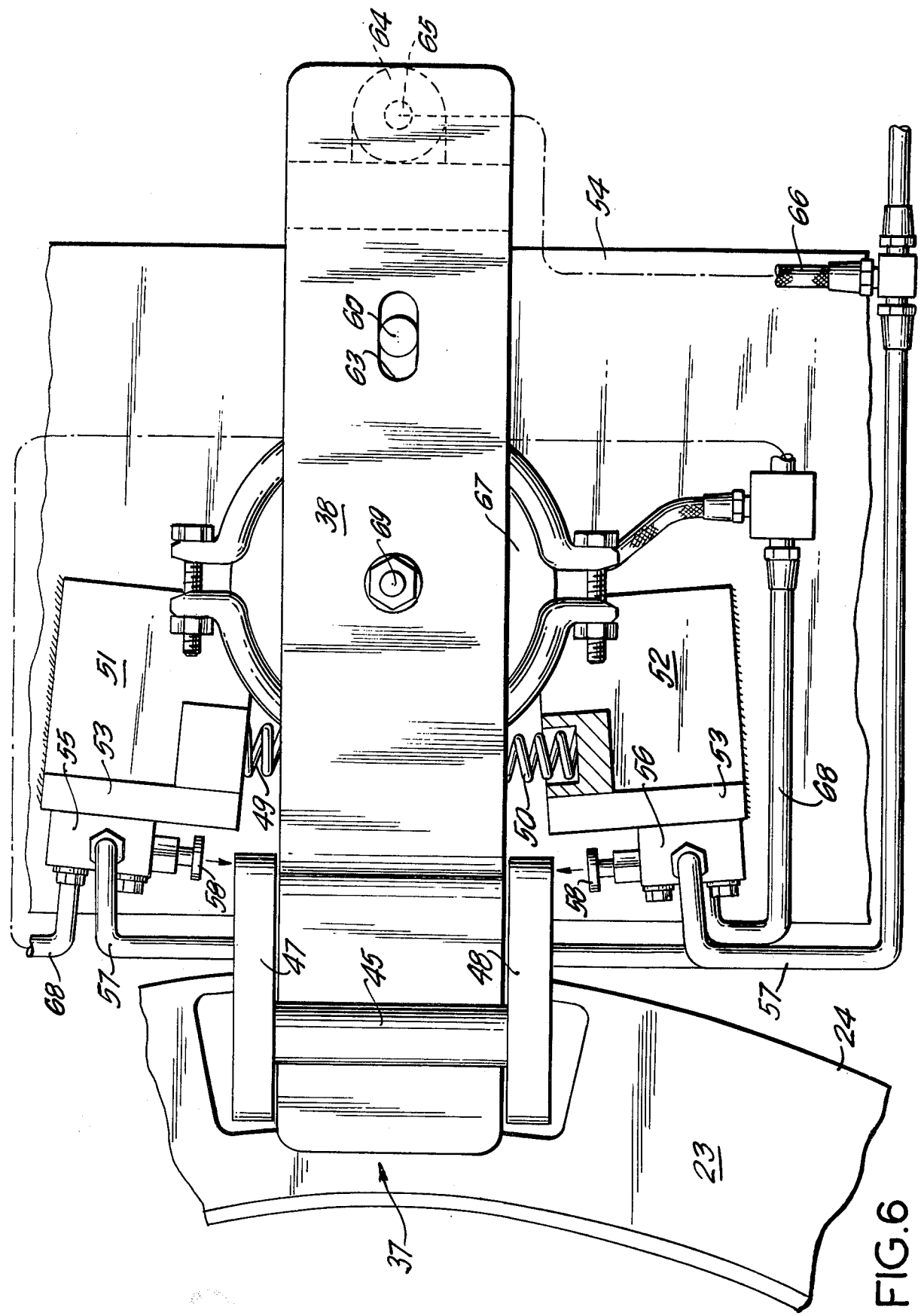
FIG. 6 is a plan view of the apparatus shown in FIGS. 4 and 5.
Figure 7:
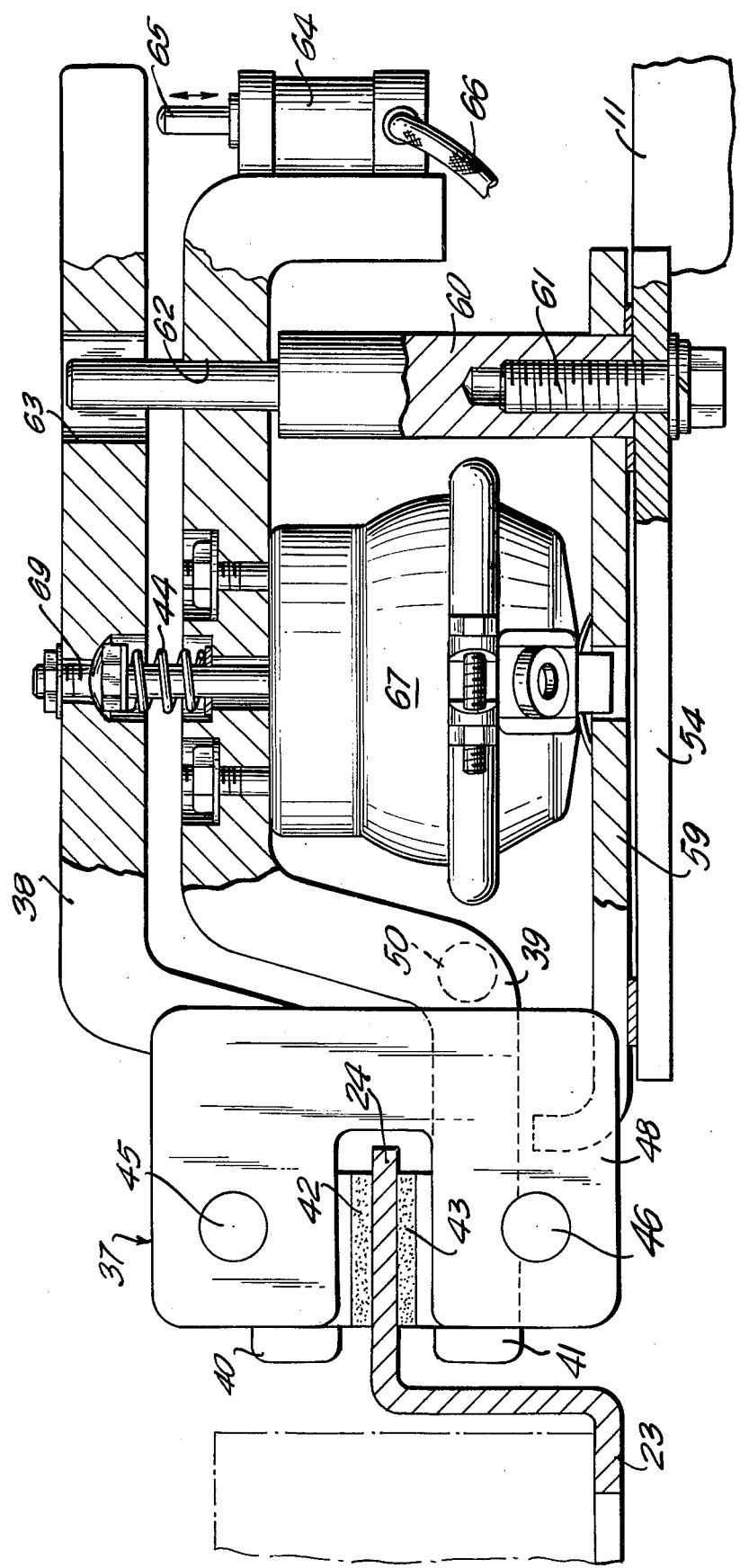
FIG. 7 is a view similar to FIG. 4 on an enlarged scale.

The mechanism whereby the control ring is restrained to achieve the purposes of the present invention is best shown in FIGS. 3 through 7. As best shown in FIG. 7, a caliper brake 37 having an upper and a lower lever 38, 39 is positioned on the tractor 11. The levers 38, 39 end in jaw members 40, 41 which straddle the horizontal control ring flange 24. Brake pads 42, 43 are secured to each of the jaws 40, 41 in the well-known manner and are in light frictional contact with the upper and lower surfaces of flange 24. In the absence of foot pressure on the vehicle brake pedal, however, the caliper brake mechanism will not restrain the control ring as hereinafter more fully described. The contact of the pads 42, 43 is maintained by means of the spring 44, which cooperates with fulcrum pins 45, 46 which extend from spaced, side plates 47, 48 on the caliper brake across the top and bottom of the jaws 40, 41 respectively.

Centering springs 49, 50, best shown in FIG. 6, carried by valve blocks 51, 52 serve to center the caliper brake 37 when the braking system is at rest.

Figure 4:
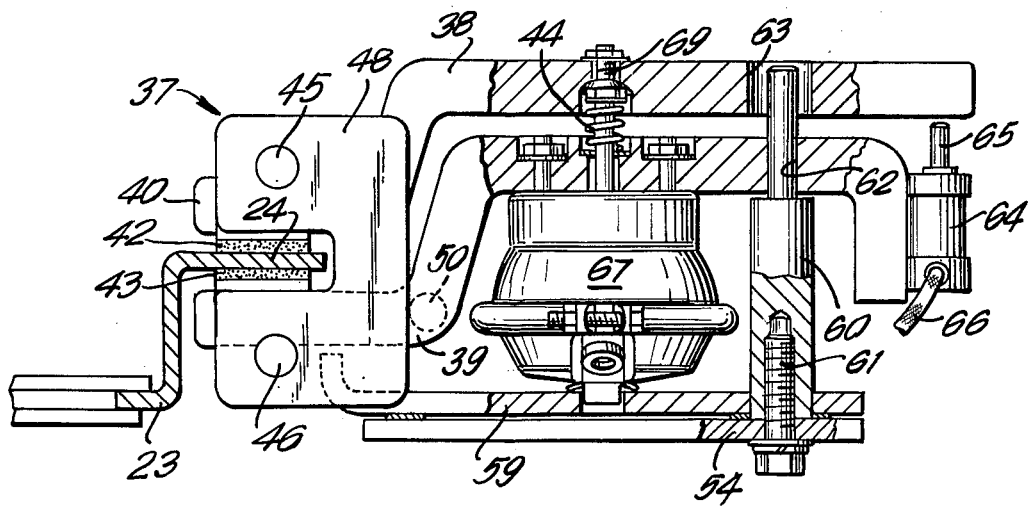
FIG. 4 is a view in side elevation of the brake and valve portion of the control apparatus of the present invention with certain parts removed for the sake of clarity.
Figure 5:
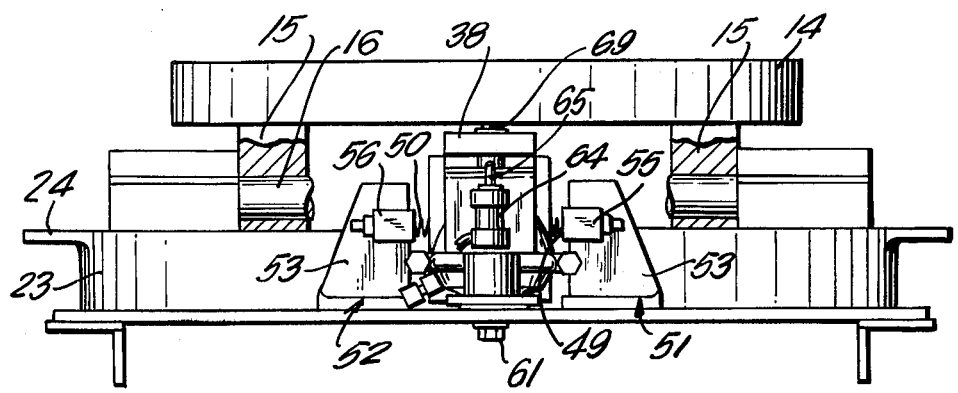
FIG. 5 is an end view of the apparatus shown in FIG. 4 on a reduced scale.

The valve blocks 51, 52, which also act as positive stops for the swing of the brakes, are secured to upstanding brackets 53 rigidly carried upon a base plate 54 attached to the tractor frame as best shown in FIG. 4. It will be seen that the valve blocks 51, 52 are equally spaced on either side of the longitudinal center line of the caliper brake 37 and serve to support and locate control valves 55, 56 which are connected by fluid lines 57 leading to the brake system of the vehicle.

Each of the valves is provided with an actuating button 58 disposed in the path of the caliper brake as it swings laterally during the operation of the device.

As best shown in FIGS. 4 and 7, the caliper brake 37 is secured to a carrier plate 59 which is swingably carried upon an upstanding stud 60 secured by a bolt 61 to the base plate 54. The stud 60 extends upwardly through openings 62, 63 in the levers 38 and 39. The openings 62, 63 are of a size which will provide sufficient clearance for the levers as they move in the operation of the device.

A small fluid cylinder 64 is secured to the end of lower lever 39 with its piston rod 65 disposed toward the upper lever 38. A flexible fluid line 66 is connected between the cylinder 64 and the vehicle fluid brake lines (not shown) so that upon the application of pressure to the vehicle brake pedal, the piston rod 65 will move upwardly against the upper lever 38 urging the jaws 40, 41 toward each other to bring the brake pads 42, 43 into greater frictional contact with the surfaces of the flange 24. This contact will cause the caliper brake 37 to swing and thus follow any rotary motion of the control ring 23 in either direction.

The distance of the actuating buttons 58 is adjusted with respect to the permitted angular lateral movement of the trailer. As the trailer approaches the end of the permitted lateral movement, the control ring will swing the caliper brake so that one of the side plates 47 or 48 will come into contact with an actuating button 58. Fluid from the service brake line is connected to the intake ports of valves 55, 56 so that when the trailer reaches the end of its permitted lateral swing, the valve 55 or 56 will open to release fluid into the main caliper brake chamber 67. The main caliper brake chamber 57 is connected to the valves 55, 56 by flexible hoses 68.

The main caliper brake chamber 67 is secured to lower lever 39 and is coupled to upper lever 38. As the piston rod 69 is driven upwardly the levers 38, 39 are forced apart to bring the full braking force of the caliper brake to bear upon the flange 24 of the control ring 23, thereby arresting the lateral movement of the trailer.

The natural tendency of the trailer after being restrained in one direction is to swing in the opposite direction. At this point it is essential that the braking action of the caliper brake be released automatically and without need for any action on the part of the operator. This release is brought about by the present device, since as the trailer swings away from its lateral limit it will cause the control ring 23 to rotate thereby swinging the caliper brake 37 until the actuating button 58 closes the valve 55 or 56, thereby shutting off the main caliper brake and releasing the caliper jaws 40, 41.

If the trailer should swing beyond the center line of the vehicle, the same sequence is repeated in the opposite direction until stability is reached.

It will be apparent that other control ring restraining mechanisms may be employed in order to control the trailer portion of a tractor-trailer vehicle without departing from the spirit of the present invention. One such restraining mechanism is to be found in FIG. 8 in which the control ring 70 has a substantially "L" shaped cross-section with an upstanding flange portion 71. The control ring is journaled upon a bearing ring 72 and maintained in position by a retainer ring 73. The brake portion 87 of the embodiment includes a lever 74 which is carried at one end by an upstanding stud 75 and is bent as indicated at 76 so that it is disposed over the top of the flange portion 71 of the control ring 70 and overlies the outer surface 77 of said ring. The lever 74 supports an arcuate brake pad 78 which is adjustable by means of an adjusting screw 79 for the purpose of bringing it into a desired frictional contact with the control ring surface 77. The stud 75 is carried by a pivot plate 80 swingably secured to a base 81 by means of a stud 82.

An inner brake pad 83 is supported by an arcuate segment member 84 which in turn is carried upon a slidable support plate 85. The opposite end of the support plate 85 is coupled to a fluid cylinder 86 which is connected to the fluid lines of the vehicle brake system as described above in connection with FIGS. 1–7.

Figure 8:
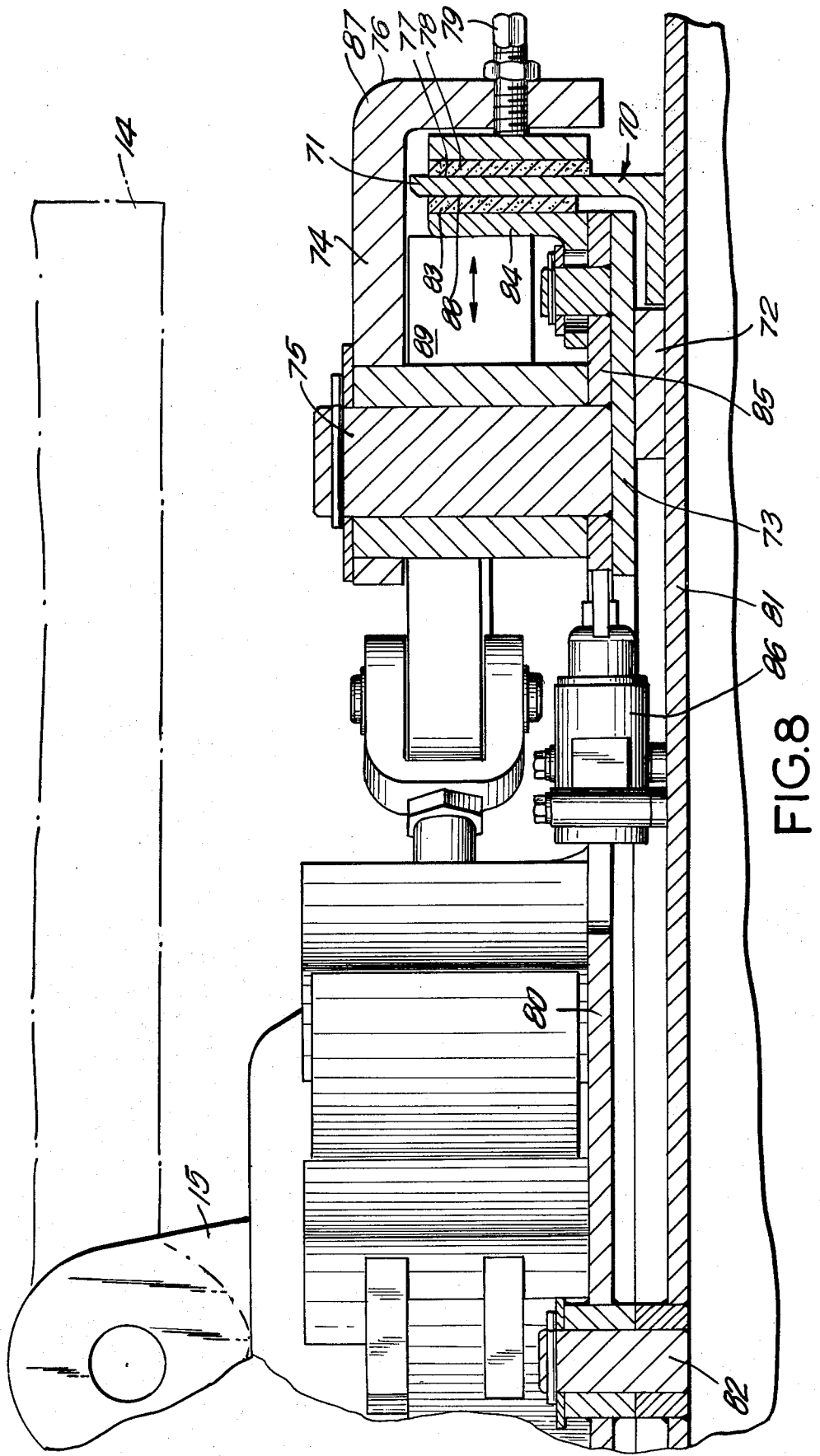
FIG. 8 is a fragmentary view in side elevation of another embodiment of the present invention.

The operation of the embodiment of FIG. 8 is substantially the same as that described above for FIGS. 1–7. As the vehicle operator presses the brake pedal, the fluid cylinder 86 will be activated, urging the inner brake pad 83 against the inner surface 88 of flange 71. As the control ring 70 is rotated by the lateral movement of the trailer the brake portion will swing as the control ring 70 is rotated by the lateral movement of the trailer. The brake portion will swing with the control ring until it reaches the permitted limit of travel. As in the embodiment of FIGS. 1–7, stop means at the end of the permitted travel (not shown in FIG. 8) disposed in the path of the brake portion activate a main caliper brake chamber to apply full restraining force to the control ring brake. An auxilliary cam means 89 which can be brought to bear against the arcuate segment 84 and which is activated by air cylinders (not shown) may be used to lock the restraining means in the closed position at this time. When the restrained trailer begins to return to its in-line position, the control ring and the pivot plate will follow the motion of the trailer, thereby shutting off the fluid to the quick release valve of the fluid cylinders and releasing the grip of the brake portion 71 so that the tractor-trailer will maneuver normally.

From the foregoing it will be seen that there has been provided a trailer control device for tractor-trailer vehicles which is readily installed, relatively simple in construction a space which will not interfere with other apparatus on the vehicle. The apparatus will operate without attention by the driver when the vehicle brakes are applied without regard to which way the trailer swings or how many swings the trailer makes before coming to a safe, in-line position.

Having thus fully described the invention, what is desired to be claimed and secured by letters patent is:

1. A trailer control apparatus for a tractor-trailer vehicle in which the trailer is swingably coupled to the tractor by a fifth wheel carried by the frame of the tractor and a kingpin carried by the trailer, said tractor-trailer vehicle having a fluid brake system including fluid lines and a brake pedal, said control apparatus comprising a support plate rigidly secured to the tractor frame, a control ring freely and rotatably carried by the support plate, control ring restraining means swingably coupled to the tractor frame, means to acutate the restraining means in response to the application of the tractor brake pedal to bring said restraining means into frictional contact with the control ring, a hitch connected at one end to control ring and at its other end to the trailer portion of the vehicle whereby lateral movement of the trailer will rotate the control ring upon the support plate, and spaced stop members on the tractor to activate the said restraining means when the brake pedal of the tractor is applied and the trailer reaches its maximum permitted angle of lateral movement.

2. A control apparatus according to claim 1 in which the control ring is formed with at least one flanged portion and the restraining means includes a brake and at least one brake pad frictionally engagable with the surface of said flanged portion.

3. A control apparatus according to claim 2 in which the control ring brake is a caliper brake.

4. A control apparatus according to claim 2 in which the control ring has a substantially "Z" shaped cross-section, including a top and a bottom flanged portion horizontally extending in opposite directions from an upstanding portion.

5. A control apparatus according to claim 4 in which the support plate includes a circular bearing plate to freely receive the periphery of one of the control ring flanges thereon.

6. A control apparatus according to claim 1 in which the control ring is discontinous for a portion of its circumference to form a gap facing the trailer portion of the vehicle and an upstand stud is carried on each side of said gap to receive an end of the hitch.

7. A control apparatus according to claim 1 in which the stop members support fluid valves in communication with the vehicle fluid brake system, said valves being disposed in the path of the control ring restraining means whereby one of said fluid valves will operate the said restraining means as the control ring reaches the permitted end of its travel to stop the further movement of said control ring toward the stop member.

8. A control apparatus according to claim 7 in which the control ring restraining means includes a fluid chamber, a piston rod actuated by fluid in the chamber, said chamber being in communication with the vehicle fluid brake system and under the control of the fluid valves of the control ring restraining means.

9. A control apparatus according to claim 8 in which the control ring restraining means includes spaced, pivotally supported upper and lower levers spaced from each other, a brake jaw on the end of each of said levers disposed adjacent the control ring for frictional contact therewith a fluid cylinder secured to one of the said levers at the end of the lever opposite said jaws, a piston rod actuated by the fluid cylinder to engage the other of said levers, said fluid cylinder being connected to the fluid brake system of the vehicle whereby pressure applied to the vehicle brake pedal will force the ends of the levers apart and bring the jaws into frictional contact with the control ring.

10. A control apparatus according to claim 9 in which the lower lever is secured to the fluid chamber, the fluid chamber piston rod is freely received through an opening in said lower lever and is coupled to the upper lever to force the said levers apart and close the jaws upon the control ring when the control ring reaches the end of its permitted travel.

11. A control apparatus according to claim 1 in which the support plate and the control ring are disposed beneath the fifth wheel of the vehicle and the control ring is substantially concentric with said fifth wheel.

12. A control apparatus according to claim 11 in which the control ring restraining means is carried outside of the control ring and remote from the hitch.

13. A control apparatus according to claim 1 in which the control ring restraining means is carried within the periphery of the control ring and below the fifth wheel of the vehicle.

14. A control apparatus according to claim 13 in which the control ring is substantially "L" shaped in cross-section, and the control ring restraining means frictionally contacts the upstanding portion of said control ring.

* * * * *